G. W. RIKER.
COLLAPSIBLE MOLDING DEVICE FOR CULVERTS, &c.
APPLICATION FILED APR. 6, 1910.
994,200.
Patented June 6, 1911.
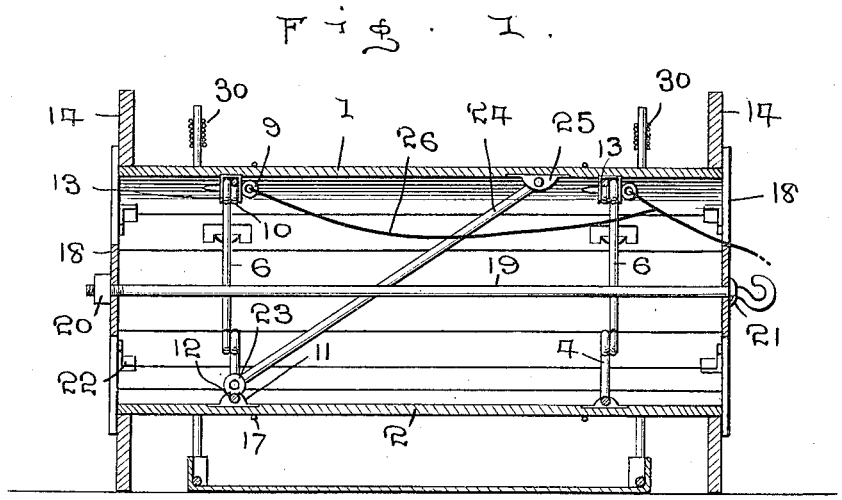
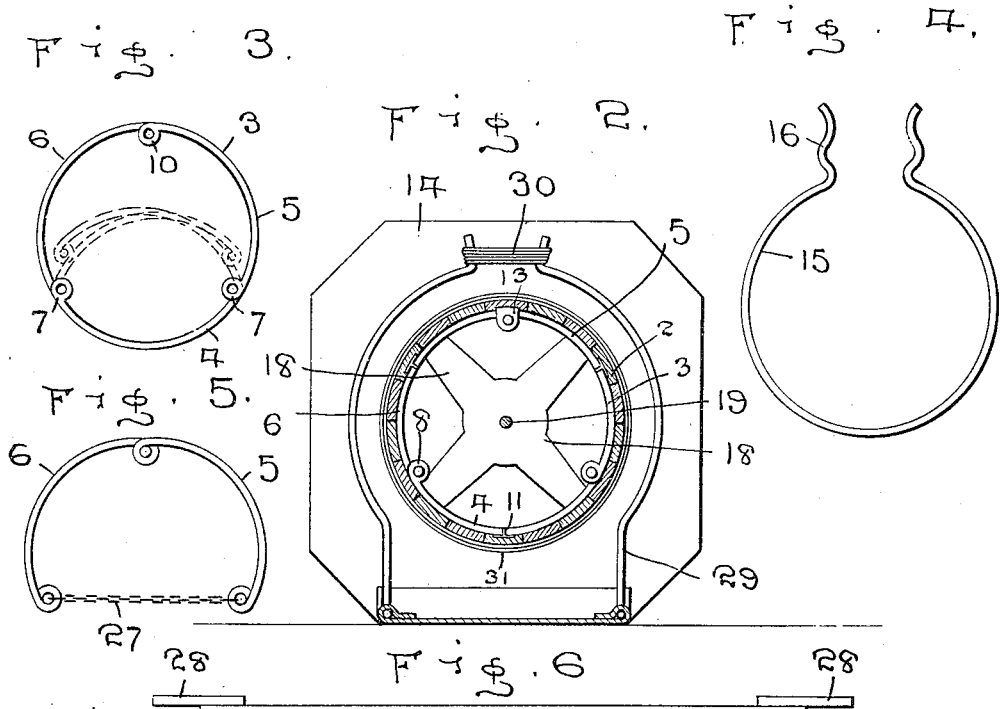

UNITED STATES PATENT OFFICE.

GEORGE W. RIKER, OF RUSSELL, IOWA.

COLLAPSIBLE MOLDING DEVICE FOR CULVERTS, &c.

994,200.

Specification of Letters Patent.

Patented June 6, 1911.

Application filed April 6, 1910. Serial No. 553,779.

*To all whom it may concern:*

Be it known that I, GEORGE W. RIKER, a citizen of the United States, residing at Russell, in the county of Lucas and State of Iowa, have invented certain new and useful Improvements in Collapsible Molding Devices for Culverts, &c.; and I do hereby declare the following to be a full, clear, and exact description of the invention, such as will enable others skilled in the art to which it appertains to make and use the same.

My invention relates to new and useful improvements in molding devices and more particularly to that class adapted to be used for molding culverts, silos and similar hollow devices and my object is to provide means for holding a plurality of bars in an assembled position.

A further object is to provide means within the mold for reinforcing the walls thereof.

A further object is to provide means for releasing said reinforcing devices.

A further object is to provide means whereby a number of the molds may be attached end to end.

A further object is to provide means for locking the parts of the mold in their assembled positions.

A further object is to provide means for bracing the mold longitudinally, and, a still further object is to provide means for holding the bar supporting members in vertical position within the mold.

Other objects and advantages will be hereinafter referred to and more particularly pointed out in the specification and claims.

In the accompanying drawings which are made a part of this application, Figure 1 is a vertical central sectional view through the mold. Fig. 2 is a transverse sectional view thereof. Fig. 3 is a plan view of the interior bracing means for the mold sections. Fig. 4 is a plan view of a clamping device to hold the parts of the mold around the interior bracing mechanism. Fig. 5 is a plan view of an interior bracing mechanism where an arch is to be built, and, Fig. 6 is an elevation of one of the mold bars showing the manner of connecting a number of the molds end to end.

Referring to the drawings in which similar reference numerals designate corresponding parts throughout the several views, 1 indicates the casing of the mold, which is constructed from a plurality of bars 2, said bars being placed edge to edge when in their assembled position.

In order to interiorly brace the casing when the bars are assembled together, I provide bands 3, which bands are preferably formed of three or more sections 4, 5 and 6, each section forming an arc of a circle, which when assembled will form a complete circle, one end of each of the sections 5 and 6 being pivoted respectively to the ends of the section 4 by providing said sections with eyes 7, through which are introduced pivot pins 8. The opposite ends of the sections 5 and 6 are then brought into registration with each other and a locking pin 9 introduced through the eyes 10 thereon.

After the bands are assembled together, the bars 2 are positioned therearound, thereby forming a tubular casing and in order to hold the bands in proper alinement within the casing, certain of the bars are provided on their inner faces with plates 11, in which are formed notches 12, said notches being adapted to receive the sections forming the band.

There are preferably two of the bands for each casing and the locking ends of the sections are preferably introduced into clips 13, said clips having openings therethrough to receive the pins 9. The bars, when assembled, are held in position around the bands 3 by means of head blocks 14, one at each end of the bars, said head blocks having openings therethrough to receive the ends of the bars. These head blocks form a support for the casing and also limit the length of the article being molded. Should the head blocks not be used, however, loops 15, preferably of wire, are placed around the casing and the ends 16 thereof secured together in any preferred manner, as by wrapping a cord one or more times around said ends and drawing the cord taut when the same is fastened. When this operation is performed, binding wires 17 are introduced around the casing and the ends thereof fastened, which will serve to hold the casing in its assembled position. As soon as the binding wires have been placed in position around the casing, the loops 15 are to be removed.

The head blocks 14 and the bars forming the casing are locked together by placing spiders 18 at each end of the casing, said spiders being connected together and clamped into engagement with the ends of the casing by means of a rod 19, said rod extending longitudinally of the casing and through the sections of the spiders, one end of the rod being threaded to receive a nut 20, while the opposite end thereof is provided with any suitable form of head 21. The ends of the spiders project beyond the periphery of the casing 1 and serve to hold the head blocks in position on the casing, while the bars 2 forming the casing are further reinforced and held in position by placing brackets 22 on the inner faces of the spiders, upon which the ends of certain of the bars 2 rest. The casing is further reinforced by providing one of the bands with an upwardly extending eye 23, with which is engaged one end of a brace 24, the opposite end of the brace being engaged with an ear 25 carried by one of the bars 2 and as said brace bar extends from the lower to the upper portion of the casing and at an angle to the trend of the casing, said brace will assist in holding the casing in rigid position.

After the molding operation has been completed, the rod 19 is removed from the spiders and the spiders removed from the ends of the casing, when the head blocks 14 will be free to leave the ends of the casing. The bands 3 are then removed by removing the locking pins 9 from the eyes 10, thus permitting the ends of the sections 5 and 6 to drop down or assume the position shown by dotted lines in Fig. 3, when the bands may be removed from the casing and the bars 2 thus left to be knocked down and removed from the molded article.

The locking pins 9 are preferably removed simultaneously and one end of each of the pins has attached thereto a cable 26, the free end of which cable is projected beyond the end of the mold, whereby said end may be readily grasped to release the locking pins when it is desired to remove the casing from the molded article.

If it is only desired to form an arch instead of a cylindrical body, the section 4 of the band is dispensed with and the sections 5 and 6 used, the free ends of said sections being adapted to be engaged with the ground and preferably connected together by means of a chain 27, whereby the same will be prevented from separation but it will be readily understood that any suitable means for holding the ends of the sections against separation may be used. In this form, the bars 2 are placed around the sections 5 and 6 in exactly the same manner as in cylindrical form and the means for retaining the same about the bands is the same as in the other form with possibly a change to a semi-circular design from a circular one, which is really a very trivial matter.

In some instances, it is desired to construct a device of greater length than the single casing and when such is the case, any number of casings may be placed end to end and one set of the bars provided on their ends with extensions 28, which are adapted to engage the inner faces of the bars of the next casing, thereby forming a continuous casing for any distance.

When it is desired to form an outer casing of concrete around a culvert or the like and at a desired thickness, frame sections 29 are provided, which frame sections have their lower ends preferably secured to the ground, while the upper curved portions thereof are extended around the casing 1 at a distance therefrom, the extreme upper ends of the frame sections being attached together by securing a cord or the like 30 around said upper ends. The frame sections 29 are adapted to receive therearound additional bars similar to the bars 2 and any preferred means may be provided to hold the bars in place while the molding operation is being performed.

It will thus be seen that I have provided a very cheap and economical form of mold, such as is designed primarily to form arches or bodies having circular openings therethrough. It will further be seen that the casing of the mold can be quickly assembled and applied to use and that the parts forming the mold will be rigidly held in position when assembled. It will likewise be seen that the parts of the mold can be quickly knocked down and removed from the molded object. It will likewise be seen that by placing a strip of tarred or other form of paper 31 around the bars 2, the interior of the culvert or other object being molded will be left perfectly smooth, while the bars will more readily separate when being removed from the molded object.

What I claim is:—

1. In a mold of the class described, the combination with a casing formed of a plurality of bars, of collapsible bands adapted to fit in said casing, means to hold the bands in position within the casing, pins adapted to hold the bands in their expanded positions and means to release said pins simultaneously, whereby the bands will collapse.

2. In a mold of the class described, the combination with a casing formed of a plurality of bars; of collapsible bands adapted to fit within said casing, means to hold said bands in position within said casing, clips carried by the inner faces of certain of said bars to receive the locking ends of said bands, pins extending through said clips and the ends of said bands to retain the same in expanded position, and means to simultaneously release said pins, whereby the bands will collapse.

3. In a mold of the class described, the combination with a casing formed of a plurality of bars; of collapsible bands adapted to fit within said casing, plates secured to the inner faces of certain of said bars and having notches therein to receive said bands and position the same within said casing, clips carried on the inner faces of certain other bars to receive the locking ends of said bands, pins extending through said clips and the ends of said bands, and means to simultaneously release said pins to allow said bands to collapse.

4. In a mold of the class described, the combination with a casing formed of a plurality of bars; of collapsible bands about which said casing is formed, plates on the inner faces of certain of said bars and having notches therein to receive said bands for the positioning of the same within said casing, outside bracing means for said bars, additional means to brace said bars from within, said latter means coöperating with one of said bars and one of said bands, and means to cause said bands to collapse.

In testimony whereof I have signed my name to this specification in the presence of two subscribing witnesses.

GEORGE W. RIKER.

Witnesses:
A. F. JENKINS,
HOMER JEFFRIES.

Copies of this patent may be obtained for five cents each, by addressing the "Commissioner of Patents, Washington, D. C."